United States Patent [19]
Cardinal

[11] 3,945,493
[45] Mar. 23, 1976

[54] SHRINK WRAP SYSTEM FOR PRODUCTS ON PALLETS AND SLIP SHEETS

[75] Inventor: Thomas J. Cardinal, Minneapolis, Minn.

[73] Assignee: The Pillsbury Company, Minneapolis, Minn.

[22] Filed: Nov. 13, 1974

[21] Appl. No.: 523,608

[52] U.S. Cl. ......... 206/386; 206/497; 229/DIG. 12; 53/30 S
[51] Int. Cl.² B65D 65/00; B65D 19/00; B65D 53/00
[58] Field of Search .............................. 156/84–86; 264/DIG. 81; 161/410, DIG. 6, 70, 43; 206/386, 497; 229/DIG. 12; 53/30 S

[56] References Cited
UNITED STATES PATENTS

| | | | |
|---|---|---|---|
| 3,040,968 | 6/1962 | Long et al. | 161/DIG. 6 |
| 3,638,790 | 2/1972 | Schmid et al. | 206/497 |
| 3,667,598 | 6/1972 | Zelnick et al. | 229/DIG. 12 |
| 3,862,878 | 1/1975 | Azuma | 161/DIG. 6 |

*Primary Examiner*—William Price
*Assistant Examiner*—Douglas B. Farrow
*Attorney, Agent, or Firm*—James V. Harmon; Michael D. Ellwein

[57] ABSTRACT

Packages supported upon a pallet or slip sheet are stabilized and held securely together by a sleeve or tube of an open mesh thermoplastic heat shrinkable net enclosure that extends around the periphery of the load and usually is open at the top and bottom. The sleeve and loaded pallet or slip sheet is exposed to a source of heat to shrink the sleeve about the load of packages to thereby hold them in place. The openings in the net permit free circulation of air and the degree of prestretch given to the horizontal and vertical fibers controls horizontal and vertical shrinkage of the sleeve.

17 Claims, 5 Drawing Figures

U.S. Patent  March 23, 1976  3,945,493
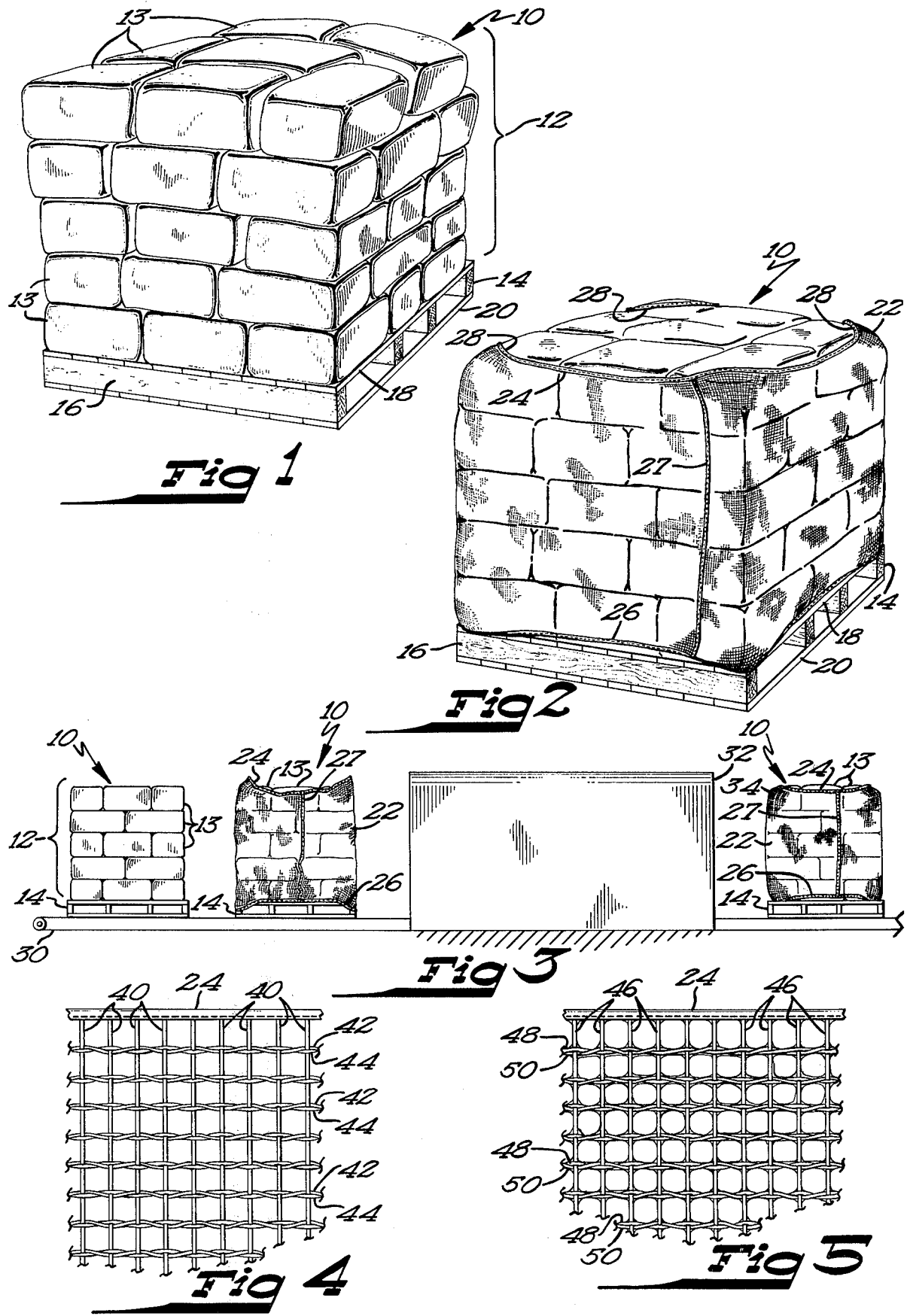

SHRINK WRAP SYSTEM FOR PRODUCTS ON PALLETS AND SLIP SHEETS

FIELD OF THE INVENTION

The present invention relates to packaging methods, the resulting package and to heat shrinkable wrappings for packages.

THE PRIOR ART

Heat shrinkable plastic sleeves formed from plastic film have been used on an ever increasing scale in recent years. There are several important defects in present products. The first is that the degree or percentage of shrink in the vertical and horizontal directions cannot be controlled as well as desired. Moreover, the strength of film is not always satisfactory. In addition, the applicant of the present invention found in experimental work leading to the development of the invention that perforated plastic film does not allow adequate circulation of air. This leads to an accumulation of moisture primarily from condensation in some products. This is especially true when the product is packed warm or loses moisture during transit which is the case with flour and certain other foods. This in turn results in degradation of food products contained in the packages.

Prior patents show plastic films of this kind with one or more holes. Examples are U.S. Pat. Nos. 3,092,439; 3,097,787; and 3,804,235. Films of this general kind were tried but found unworkable for the purposes of the invention, the primary disadvantage being moisture condensation due to lack of air circulation around the group of packages. Other patents that show various approaches in overwrap packaging are U.S. Pat. Nos. 2,545,243; 3,640,048; 3,667,598 and 3,670,880. Plastic foam has also been applied in heat shrink applications but in addition to being relatively weak in strength, air circulation through plastic foam is relatively poor. Examples are patents 3,563,839 and 3,734,273. Furthermore, the relative shrink in vertical and horizontal shrink is hard to control.

OBJECTS OF THE INVENTION

The primary objects are: (a) to provide a shrinkable closure or overwrap for packages wherein the high degree of strength can be achieved with a relatively small amount of overwrap material, (b) excellent control and a wide degree of variability between horizontal and vertical shrink, (c) excellent air circulation through the overwrap, (d) good performance in large size packaged units such as pallets measuring about 4 feet by 4 feet in plan view and as much as 50 or more inches high and a total weight being upwards of as much as 2,900 pounds or more, (e) suitability for applications in which the stretch in both vertical and horizontal directions is either the same or substantially different and wherein the shrink wrap sleeve can be formed from any of several readily available packaging materials.

THE FIGURES

FIG. 1 is the perspective view of a loaded pallet in a loose condition with the upper layer shifting, before the sleeve is applied.

FIG. 2 is a view of the loaded pallet similar to FIG. 1 with the sleeve of the invention applied and shrunk into place.

FIG. 3 is a side elevational view on a reduced scale of the pallets traveling through a shrink tunnel.

FIG. 4 is a view of a portion of the shrink wrap sleeve slightly reduced from its natural size, and FIG. 5 is a view similar to FIG. 4 showing a portion of a shrink wrap sleeve of a different material.

SUMMARY OF THE INVENTION

Packages loaded on a pallet or slip sheet are stabilized and held firmly in place by an open mesh thermoplastic heat shrinkable woven or unwoven net material or fabric that extends around the periphery of the load on the pallet. The net is preferably a sleeve or tube that is open at the top and bottom. The loaded pallet is exposed to a source of heat to shrink the sleeve onto the load of packages to thereby secure them in place.

The openings in the net permit free circulation of air and the degree of pre-stretch of the horizontal and vertical fibers controls horizontal and vertical shrinkage of the sleeve.

In the typical application, the fabric consists of highly stretched organic resinous ribbons that are bunched or gathered transversely to form a fiber. The width of each ribbon is on the order of about 1/32 to 1/16 inch. The net can be knitted if desired or the fibers merely adhered together, for example by means of an adhesive or thermoplastic bonds at their points of contact rather than comprising a true woven net. A woven net is, however, greatly preferred because of its commercial availability and strength. While the term "sleeve" has been used herein, the term is meant to encompass a shrinkable wrapper that extends over the top and sides of the stack of packages as well as one that encloses the side only and not the top.

DESCRIPTION OF THE PREFERRED EMBODIMENT

In FIG. 1 is shown a loaded pallet 10 composed of five layers of filled packages 12 rather loosely stacked with the upper layers shifting, the stack is resting on a wooden pallet 14 formed from the usual wooden stringers 16 and the top and bottom platforms 18 and 20 respectively.

In FIG. 2 the shrink wrap sleeve 22 has been applied. Sleeve 22 includes a circular upper edge 24 which at least at certain points e.g. on the corners 28 projects centrally from the upper edge of the load 12. The edges 24 and 26 can be standard selvage edges. The sleeve is made from a rectangular piece of net by sewing it to itself to form an endless tube along a vertical seam 27 (FIG. 2). The lower circular edge 26 which extends horizontally around the bottom of the load 12 can be unattached but if desired it can be secured to the bottom layer of packages or to the top of the pallet in any suitable way, for example by means of staples, nails, etc. The sleeve consists of a woven net or fabric.

As shown in FIG. 3, the packages 12 are first covered with the sleeve 22 and then passed through a commercially available heat shrink tunnel 32 where heat is applied for sufficient time to shrink the sleeve tightly onto the packages 12 with at least portions of the top 28 preferably extending centrally over the corners of the load.

Any suitable commercially available shrink tunnel can be used. The shrink tunnel normally includes a gas or electrically heated hot air oven which shrinks the sleeve by exposing it to hot air. A typical shrink temperature and time is between about 300°F. and 400°F.

and preferably between 325°F. to 335°F. for about 10 seconds. The time and temperature will, of course, vary depending upon the net. Longer times are required for lower temperatures.

FIGS. 4 and 5 show two forms of woven net in accordance with the invention. As seen in FIG. 4, the warp fibers 42 and 44 consist of stretched strands of a thermoplastic resinous material such as polyvinylchloride or a polyolefin for example, polyethylene or polypropylene, the latter being preferred. The number of fibers per lineal inch is typically about 1.5 to 5.5 per inch. The weft fibers 40 are formed from any of the thermoplastic materials listed above or can consist of a nonshrinkable material. The warp normally runs in a horizontal direction and weft in a vertical direction. Excellent results have been achieved in the present invention by providing the fibers in both vertical and horizontal directions with a 2.5% stretch which will cause them to shrink by approximately 16% when heat is applied. It is not as necessary for the weft fibers to shrink (in a vertical direction) but the warp fibers should shrink. Thus, the weft fibers 40 can be provided with little or no stretch which will result in little or no shrinkage upon the application of heat whereas the warp fibers are provided with about 2.5% stretch. This will bind the load 12 together by the application of horizontal forces only.

A similar woven net of a somewhat looser weave is shown in FIG. 5. The warp fibers are indicated at 48 and 50 and the weft fibers at 46. This net has four openings to the inch in the cross machine direction and five openings to the inch in the machine direction.

One preferred net material comprises a thermoplastic shrinkable woven material or combination of thermoplastic and a non-shrinkable fiber in gauges of about 0.002 inch to 0.030 inch. The width of each fiber is preferably between about 1/32 inch and ¼ inch with about 1.5 to 5.5 fibers per lineal inch. The net material can include an ultraviolet stabilizer and a shrink ratio that varys from about 1% to 20% depending upon the amount of stretch the fibers are subjected to.

Another preferred net material which was found suitable for use in the invention will now be described by way of example. The net consists of a polypropylene fibers and weighs 2.3 ounces ± 15% per square yard including the selvages. The weight is determined by ASTM method D 1910. The count, determined by the same method is warp 8 per inch +1, −0.5 and weft 5.5 +1 −0.5 per inch. The tensile strength as measured by ASTM test D 1682 (grab method) 40 pounds minimum average for the warp and 30 lbs. minimum average for the weft. The tensile strength of the seam 27 as determined by ASTM test 1683 (grab method) is at least 70% of the average tensile strength of the material itself. For tensile tests the jaw speed should be 12 inches per minute and the distance between jaw 3 inches. The number of fibers or ribbons in the jaw during the test is 8 for the warp and 6 for the weft. The shrinkage upon heating of a 10 inch × 10 inch sample at 125°C. for 20 minutes is warp 10–12% and weft 15–20%.

The fibers from which the net is formed each consist of ribbons of about ⅛ inch in width and 2 mills in thickness. These ribbons are highly directionally oriented by cold stretching extruded polypropylene film between about 1% and 20% of its original length in the machine direction. Ribbons are then gathered or bunched, for example by passing them through a die or the like to give them a fiberlike appearance about 1/32 to about 1/16 of an inch in width prior to being woven into the net.

While the degree of shrinkage that takes place upon heating can be different in the vertical and horizontal directions, it is preferred for the present usages to have shrinkage the same in both directions; preferably from about 2.0% to about 2.5% pre-stretch resulting in 10% to 16% shortening in the fibers during heating. In any event, by providing discrete fibers or threads in vertical and horizontal directions it is possible to produce different degrees of stretch in mutually perpendicular planes to tailor the vertical and horizontal shrinkage upon heating to exactly that needed in a specific application.

It can be seen that the invention provides a secure support for the packages and can be used either to bunch the packages together by holding them against themselves or if desired can be used to secure them to the pallet itself. The sleeves are rugged in construction, reliable in operation and provide excellent air circulation. In tests carried out in the course of development of the invention it was found that food packages, for example packages of flour, showed no greater moisture-induced deterioration e.g. mold growth than packages that were not enclosed in a shrink wrap of any kind whereas packages that were enclosed in a shrink wrap composed of perforated plastic film had a substantial amount of moisture condensation.

The unseamed net can, for example, be obtained commercially in finished form. For example, a polypropylene net material manufactured by the Patchogue Plymouth Company of Atlanta, Ga. or Western Textile Corporation, subsidiary of Chase Bag Company of Greenwich, Connecticut is suitable. This netting material is Conn. used for such things as carpet backing and potato bags.

What is claimed is:

1. A package comprising a base composed of a pallet or slip sheet, at least one container resting upon the pallet or slip sheet, a heat shrinkable open mesh net at least partially enclosing the container, the net being formed from a heat shrinkable fiber material and being heat shrunk tightly over the container and the net comprising a tube having the shape of an endless sleeve extending horizontally around the side of the container and being open at the top and bottom thereof.

2. A package comprising a supporting pallet or slip sheet, at least one container resting thereupon, an open mesh net at least partially enclosing the container, the net being formed from a heat shrinkable fiber material and being heat shrunk into engagement with the container, the net being woven and having warp and weft fibers of approximately the same degree of stretch whereby substantially the same degree of shrinkage exists in both the warp and weft fibers.

3. The enclosure of claim 2 wherein the enclosure comprises a rectangular section of netting having warp fibers running in the horizontal direction and weft fibers running in the vertical direction and a vertically disposed seam wherein the ends of the rectangular piece of net are sewn together thereby forming the rectangular section of netting into an endless sleeve.

4. A package comprising a pallet or slip sheet, at least one container resting thereupon, an open mesh net at least partially enclosing the container and pallet or slip sheet, the net being formed from a heat shrinkable synthetic, resinous material and being heat shrunk to engage the container, the net comprising threads formed from a thermoplastic material with a predetermined degree of pre-stretch prior to heat shrinking.

5. The enclosure of claim 4 wherein the fiber material comprises polypropylene.

6. The enclosure of claim 4 wherein the net comprises a polyethylene fiber.

7. The enclosure of claim 4 wherein the netting is formed from a woven thermoplastic fabric having about 3 to 10 openings per lineal inch in vertical and horizontal directions.

8. The package of claim 4 wherein the the net is formed from warp and weft fibers and warp fibers are nonshrinking upon the application of heat and the weft fibers shrink when heated.

9. A package comprising a base comprising a pallet or slip sheet, one or more articles thereon, a tube of heat shrinkable woven net material including a generally rectangular sheet of heat shrunken net material engaging the articles and having its cut ends bonded together to form the tube, said tube having a longitudinally extending seam, the tube having two sets of mutually perpendicular fibers, the first set running parallel to the axis of the tube and the second set running at right angles thereto, said tube terminating at upper and lower circular edges and being formed from stretched strands of a thermoplastic resinous material with the number of fibers per lineal inch being on the order of about 1.5 to 5.5.

10. The package of claim 9 wherein the fiber is a polyolefin.

11. The package of claim 9 wherein the net material is formed from a thermoplastic polyolefin resin.

12. The package of claim 13 wherein the polyolefin comprises polypropylene.

13. The package of claim 9 wherein the fibers are formed from pre-stretched polypropylene weighing about 2.3 ounces per square yard, the warp being 8 per inch and the weft being about 5 per inch with shrinkage upon heating of a 10 × 10 inch section at 125°C. for 20 minutes being 10–12% in the warp direction and 15–20% in the weft direction.

14. The package of claim 9 wherein the top and bottom circular edges of the tube comprise selvage edges and the weft fibers run in a vertical direction and the warp fibers run in a horizontal direction.

15. A method of wrapping loads placed on pallets or slip sheets to stabilize the load and prevent moisture condensation comprising providing a heat shrinkable woven net material having thermoplastic resinous fibers running in at least two mutually perpendicular directions, placing the net around the load, exposing the thus wrapped load to a source of heat to shrink the net material onto the load to stabilize the load and the draw the net material against the outer surface of the load.

16. The method of claim 15 wherein the net material is formed into a tube open at its upper and lower ends and the tube is placed to extend around the sides of the load with one open end at the top of the load and the other open end at the bottom edge thereof and is secured to the pallet or slip sheet prior to exposing the wrapped load to heat.

17. The method of claim 15 wherein the net is a tube formed from a rectangular section of woven net having the weft fibers running in a vertical direction, the warp fibers running in a horizontal direction and being sewn together at its cut ends to form a vertical seam, the tube being open at the bottom and top thereof and the bottom and top edges being selvage edges, the tube being placed over the load with the top and bottom edges being at the top and bottom edges of the load respectively and extending horizontally around the circumference of the load and having about 1/½ to 5½ fibers per lineal inch, the fibers being formed from a prestretched polyolefin resin and heating and net after being thus placed to shrink the fibers between about 1–20% of their original length.

* * * * *

UNITED STATES PATENT OFFICE
CERTIFICATE OF CORRECTION

Patent No. 3,945,493　　　　　　　　　　Dated March 23, 1976

Inventor(s) Thomas J. Cardinal

It is certified that error appears in the above-identified patent and that said Letters Patent are hereby corrected as shown below:

Claim 15, line 8 at the end of the line cancel "the" after "and".

Signed and Sealed this eighth Day of June 1976

[SEAL]

Attest:

RUTH C. MASON
*Attesting Officer*

C. MARSHALL DANN
*Commissioner of Patents and Trademarks*